US007332188B2

(12) United States Patent
Axelrod

(10) Patent No.: US 7,332,188 B2
(45) Date of Patent: Feb. 19, 2008

(54) ANIMAL CHEW CONTAINING FERMENTED SOYFOOD

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 86 days.

(21) Appl. No.: 10/994,524

(22) Filed: Nov. 22, 2004

(65) Prior Publication Data

US 2006/0110500 A1 May 25, 2006

(51) Int. Cl.
A01K 29/00 (2006.01)
A23J 3/14 (2006.01)
A23L 1/0522 (2006.01)

(52) U.S. Cl. .......................... 426/132; 426/72; 426/74; 426/634; 426/656; 426/657; 426/658; 426/805

(58) Field of Classification Search ................ 426/132, 426/72, 74, 634, 656, 657, 658, 805
See application file for complete search history.

(56) References Cited

U.S. PATENT DOCUMENTS

| 4,145,447 | A | | 3/1979 | Fisher et al. ................... 426/72 |
| 4,735,808 | A | | 4/1988 | Scaglione et al. ............. 426/62 |
| 5,200,212 | A | | 4/1993 | Axelrod ......................... 426/2 |
| 5,240,720 | A | | 8/1993 | Axelrod ......................... 426/2 |
| 5,339,771 | A | | 8/1994 | Axelrod ....................... 119/710 |
| 5,419,283 | A | | 5/1995 | Leo ............................. 119/709 |
| 5,827,565 | A | | 10/1998 | Axelrod ....................... 426/623 |
| 5,941,197 | A | | 8/1999 | Axelrod ....................... 119/710 |
| 5,989,604 | A | * | 11/1999 | Wolf et al. .................. 426/103 |
| 6,056,991 | A | | 5/2000 | Axelrod ....................... 426/644 |
| 6,067,941 | A | | 5/2000 | Axelrod ....................... 119/707 |
| 6,086,940 | A | | 7/2000 | Axelrod ....................... 426/623 |
| 6,093,427 | A | | 7/2000 | Axelrod ....................... 426/104 |
| 6,093,441 | A | | 7/2000 | Axelrod ....................... 426/632 |
| 6,103,290 | A | | 8/2000 | Wenger ....................... 426/516 |
| 6,110,521 | A | | 8/2000 | Axelrod ....................... 426/549 |
| 6,126,978 | A | | 10/2000 | Axelrod ....................... 426/285 |
| 6,159,516 | A | | 12/2000 | Axelrod et al. .............. 426/456 |
| 6,165,474 | A | | 12/2000 | Frudakis et al. .......... 424/195.1 |
| 6,180,161 | B1 | | 1/2001 | Axelrod ....................... 426/623 |
| 6,274,182 | B1 | | 8/2001 | Axelrod et al. .............. 426/132 |
| 6,312,746 | B2 | | 11/2001 | Paluch ........................ 426/282 |
| 6,379,725 | B1 | | 4/2002 | Wang et al. ................... 426/72 |
| 6,455,083 | B1 | * | 9/2002 | Wang .......................... 426/104 |
| 6,566,436 | B1 | | 5/2003 | Güntherberg et al. ....... 524/504 |
| 6,586,027 | B2 | | 7/2003 | Axelrod et al. .............. 426/132 |
| 6,821,538 | B2 | | 11/2004 | Axelrod et al. .............. 426/132 |
| 6,916,497 | B2 | | 7/2005 | Axelrod et al. .............. 426/132 |

OTHER PUBLICATIONS

"Biofoods" brochure, downloaded from archived pages of websites http://www.biofoodsltd.com/Soynatto.htm, Jun. 4, 2002, 10 pages.*
Daidzein [online], [retrieved on Nov. 18, 2004] Retreived from PDRhealth, using Internet <URL: http://www.pdrhealth.com/drug_info/nmdrugprofiles/nutsupdrugs/dai_0089.shtml. (4 pages).
Glycitein [online], [retrieved on Nov. 18, 2004] Retrieved from PDRhealth, using Internet <URL: http://www.pdrhealth.com/drug_info/nmdrugprofiles/nutsupdrugs/gly_0128.shtml. (2 pages).
Genistein [online], [retreived on Nov. 18, 2004] Retreived from PDRhealth, using Internet <URL: http://www.pdrhealth. com/drug_info/nmdrugprofiles/nutsupdrugs/gen_0118.shtml>. (4 pages).
Saccharomyces cerevisiae [online], [retrieved on Nov. 18, 2004] Retrieved from Wikipedia, using Internet <URL: http://en.Wikipedia.org/wiki/Saccharomyces_cerevisiae>. (1 page).
Saccharomyces cerevisiae [online], [retrieved on Nov. 18, 2004] Retrieved from University of Leicester Department of Microbiology and Immunology, using Internet <URL: http://www-micro.msb.le.ac.uk/video/Scerevisiae.html>. (3 pages).
What is Fermentation Soynatto® [online ], [retrieved on Oct. 25, 2004] Retrieved from Bio-Foods, Ltd., using Internet <URL: http://www.biofoodsltd.com/WhatIsFermentation.htm>. (3 pages).
What is Fermentation? [online], [retrieved on Oct. 25, 2004] Retrieved from Bio-Foods, Ltd., using Internet <URL:http://www.biofoodsltd.comNutriFermentation.htm>. (2 pages).
Coenzyme $Q_{10}$ [online], [retrieved on Nov. 18, 2004] Retrieved from the Linus Pauling Institute, using Internet <URL: http://lpi.oregonstate.edu/infocenter/othernuts/coq10/>. (13 pages).
Coenzyme/Cofactor (biochemistry) [online], [retrieved on Nov. 18, 2004] Retrieved from Wikipedia, using Internet <URL: http://en.Wikipedia.org/wiki/Cofactor_%biochemistry%29>. (2 pages).
Antioxidant [online], [retrieved on Nov. 18, 2004] Retrieved from the Linus Pauling Institute, using Internet <URL:http://lpi.oregonstate.edu/infocenter/glossary.html>. (1 page).
Phytochemicals [online], [retrieved on Nov. 18, 2004] Retrieved from the Linus Pauling Institute, using Internet <URL: http://lpi.oregonstate.edu/infocenter/phytochemicals.html>. (2 pages).
Phytonutrients [online], [retrieved on Nov. 18, 2004] Retrieved from the Oral Cancer Foundation, using Internet <URL: http://www.oralcancerfoundation.org/facts/phytonutrients.htm>. (2 pages).
Functional Foods [online], [retrieved on Nov. 18, 2004] Retrieved from Web Dieticians, using Internet <URL: http://www.webdieticians.org/Public/GovernmentAffairs/92_adap1099cfm>. (15 pages).
Ubiquinone [online], [retrieved on Nov. 18, 2004] Retrieved from Merriam-Webster OnLine, using Internet <URL:http://www.m-w.com>. (1 page).
Quinone [online], [retrieved on Nov. 18, 2004] Retrieved from Merriam-Webster OnLine, using Internet <URL:http://www.m-w.com>. (1 page).
Bio-Foods, LTD. One of the Worlds Best Functional Foods Now Has Nutraceutical Health Benefits. N.J. 2003. (6 pages).
Bio-Foods, LTD. The Next Generation of Coenzyme is Here BT-CoQ10 BIO-TRANSFORMED. N.J. 2003. (5 pages).

* cited by examiner

Primary Examiner—C. Sayala
(74) Attorney, Agent, or Firm—Grossman, Tucker, Perreault + Pfleger, PPLC

(57) ABSTRACT

The present invention relates to an enriched animal chew toy comprising a resin a fermented soy nutraceutical. Optionally the nutraceutical may contain enzymes or coenzymes. Also, the enriched animal chew toy may be formed by mixing a resin with the fermented soy nutraceutical in a heated molding machine. Suitable resins include starch, thermoplastic, casein, denatured and partially hydrolyzed collagen, wheat gluten, rawhide, proteins, and mixtures thereof.

17 Claims, No Drawings

ANIMAL CHEW CONTAINING FERMENTED SOYFOOD

FIELD OF INVENTION

The present invention relates to animal chews for dogs or cats. More particularly, the present invention relates to the use of fermented soy in an animal chew, uniquely enriched by vitamins and minerals or other additives. The selected composition may be incorporated within starch, casein, protein!/colloids and various other substrates or polymer resins suitable for use in an animal chew.

BACKGROUND

A number of disclosures have been made regarding the development of edible dog chews that are digestible and nutritious. Attention is therefore directed to the following exemplary disclosures: U.S. Pat. No. 6,586,027 "Health Chew Toy"; U.S. Pat. No. 6,180,161 "Heat Modifiable Edible Dog Chew; U.S. Pat. No. 6,159,516 "Method of Molding Edible Starch; U.S. Pat. No. 6,126,978 "Edible Dog Chew"; U.S. Pat. No. 6,110,521 "Wheat and Casein Dog Chew with Modifiable Texture"; U.S. Pat. No. 6,093,441 "Heat Modifiable Peanut Dog Chew"; U.S. Pat. No. 6,093,427 "Vegetable Based Dog Chew"; U.S. Pat. No. 6,086,940 "High Starch Content Dog Chew"; U.S. Pat. No. 6,067,941 "Animal Chew"; U.S. Pat. No. 6,056,991 "Turkey and Rice Dog Chew With Modifiable Texture"; U.S. Pat. No. 5,941,197 "Carrot Based Dog Chew"; U.S. Pat. No. 5,827,565 "Process for Making an Edible Dog Chew"; U.S. Pat. No. 5,339,771 "Animal Chew Toy Containing Animal Meal; U.S. Pat. No. 5,240,720 "Dog Chew with Modifiable Texture"; U.S. Pat. No. 5,200,212 "Dog Chew with Modifiable Texture". Attention is also directed to U.S. Pat. No. 6,165,474 entitled "Application for Patent for Nutriceutical Toy" and U.S. Pat. No. 5,419,283 entitled "Animal Chew Toy of Starch Material and Degradable Ethylene Copolymer".

While the above certainly contribute to the body of chew products available to an animal, there is nonetheless a need to improve on the above, particularly with respect to the delivery of vitamins and/or minerals. Particularly, the field has recognized the sensitivity of vitamins to heat, light, oxidizing agents, extremes in pH and other factors. Therefore to advance health care for animals, there is a need to consider the loss of such vitamins while processing the dog chews and/or to identify newer type supplements that enhance the nutritional nature of the chew itself.

Accordingly, it is an object of the present invention to provide a moldable dog chew toy for an animal that is enriched with vitamins and minerals to ensure that the animal's comprehensive and proper nutritional needs are maintained. In addition, it is also an object of the present invention to incorporate vitamins and minerals in a form that preserves the efficacy of the vitamins. More particularly, it is an object of the present invention to incorporate a nutraceutical of fermented soya and/or enzymes and coenzymes to the dog chew toys.

SUMMARY

An aspect of the present invention relates to an enriched animal chew toy comprising a resin and a fermented soya nutraceutical.

Another aspect of the present invention relates a method of forming an enriched animal chew toy comprising combining a resin and a fermented soya nutraceutical to form a mixture; introducing and heating the mixture to a heated molding machine containing a feed section, barrel and output section, including a plurality of heating zones extending from the hopper section to the output section; mixing; and cooling to form the mixture into an animal chew.

Another aspect of the present invention relates to an enriched animal chew toy comprising a resin and a fermented enzyme and/or a coenzyme.

Another aspect of the present invention relates to a method of forming an enriched animal chew toy comprising combining a resin and a fermented enzyme and/or coenzyme to form a mixture; introducing and heating said mixture to a heated molding machine containing a feed section, a barrel section and an output section, including a plurality of heating zones extending from said hopper section to said output section; mixing; and forming said mixture into an animal chew.

DETAILED DESCRIPTION

The present invention relates to the development of a molded resin based animal chew toy for an animal that is enriched with vitamins and minerals to contribute to the overall nutritional needs/requirements of an animal. More particularly, the present invention incorporates fermented soya nutraceutical into an animal chew of both the edible and non-edible types depending on the carrier utilized. A nutraceutical is reference to any food, as the case may be, that is delivered to the animal.

Beginning with the resin component, preferably, the resin is selected from the group consisting of starch, thermoplastic, casein, denatured and partially hydrolyzed collagen, wheat gluten, rawhide, proteins, and mixtures thereof. Starches utilized in the present invention may include potato starch, tapioca starch, corn starch, wheat starch and mixtures thereof. Thermoplastic polymers may include polymers such as polyamides and polyurethanes, as well as ethylene copolymers, such as poly(ethylene acrylic acid) and poly (ethylene vinyl alcohol). Preferably, the resin component may be present at levels of about 60-99% (wt.), and all incremental values therebetween.

By way of representative example, in the case of starch, e.g., the process herein relies upon combining starch with water to form a mixture such that the mixture is suitable for melt processing techniques. In that regard, attention is directed at commonly owned U.S. Pat. No. 6,159,516, whose teachings are incorporated by reference which discloses a preferred process for forming starch into the molded article herein. The process makes use of melt processing techniques and comprises combining starch and water wherein the water content is in the range of 20.0% to 40.0% by weight with respect to that of said starch, introducing and heating said mixture in an extruder wherein the water content of said product upon discharge from said extruder is less than the water content of said product entering said extruder, and introducing the product to a heated injection molding machine and injection molding and cooling to form said molded article wherein the water content is at or below 20% by weight.

Accordingly in connection with the above referenced processes and applicable to other processes herein described, the vitamins and minerals can be added with a base resin, e.g., starch prior to mixing or formation. It is therefore worth noting that in the context of the present invention, it has been uniquely appreciated that the vitamin and mineral additives can be injection molded in the starch mixtures without thermal degradation of such additives which degradation may attenuate or eliminate their therapeutic effect. In the context of the present invention, it is therefore preferable that a nutraceutical of fermented soya and/or enzymes and coenzymes is added to the starch mixtures.

In a preferred embodiment, the nutraceutical of fermented soya is made available from Bio Foods, Ltd., Pine Brook, N.J. and sold under the general trademark SOYNATTO, and more specifically SOYNATTO F614 and F625. Preferably, the fermented soya is present between 1-40% (wt.), and resin (e.g., starch or thermoplastic as noted above) is present at levels of about 99-60% (wt.), including all incremental values therebetween with respect to such ranges. The SOYNATTO product is more specifically described to contain the following as compared to other available compositions:

| | Made With | | | | | Constituants | | |
|---|---|---|---|---|---|---|---|---|
| Nutrient | Units per 100 g | Foods | | | | soy protein isolate | Soy milk as fluid | Tofu, regular |
| | | IEFS | Soynatto ® | Tempeh | Miso Paste | | | |
| Proximates | | | | | | | | |
| Protein | g | 37.00 | 37.00 | 18.54 | 11.81 | 80.69 | 2.75 | 8.08 |
| Total lipid | g | 7.50 | 7.50 | 10.80 | 6.07 | 3.39 | 1.91 | 4.78 |
| Carbohydrate | g | 40.00 | 40.00 | 9.39 | 27.96 | 7.36 | 1.81 | 1.88 |
| Fiber, total dietary | g | 12.02 | 12.02 | | 5.40 | 5.60 | 1.30 | 0.30 |
| Minerals | | | | | | | | |
| Calcium | mg | 151.50 | 151.50 | 111.00 | 66.00 | 178.00 | 4.00 | 350.00 |
| Iron | mg | 5.21 | 5.21 | 2.70 | 2.74 | 14.50 | 0.58 | 5.36 |
| Magnesium | mg | 191.25 | 191.25 | 81.00 | 42.00 | 39.00 | 19.00 | 30.00 |
| Phosphorus | mg | 608.25 | 608.25 | 266.00 | 153.00 | 776.00 | 49.00 | 97.00 |
| Potassium | mg | 1957.50 | 1957.50 | 412.00 | 164.00 | 81.00 | 141.00 | 121.00 |
| Sodium | mg | 18.30 | 18.30 | 9.00 | 3647.00 | 1005.00 | 12.00 | 7.00 |
| Zinc | mg | 3.84 | 3.84 | 1.14 | 3.32 | 4.03 | 0.23 | 0.80 |
| Copper | mg | 3.93 | 3.93 | 0.56 | 0.44 | 1.60 | 0.12 | 0.19 |
| Manganese | mg | 2.40 | 2.40 | 1.30 | 0.86 | 1.49 | 0.17 | 0.61 |
| Selenium | mcg | 27.98 | 27.98 | 0.02 | 1.60 | 0.80 | 1.30 | 8.90 |
| Lithium | mcg | 60.00 | 60.00 | tr | tr | tr | tr | tr |
| Molybdenum | mcg | 6.00 | 6.00 | tr | tr | tr | tr | tr |
| Nickel | mcg | 30.00 | 30.00 | tr | tr | tr | tr | tr |
| Tin | mcg | 12.00 | 12.00 | tr | tr | tr | tr | tr |
| Lipids | | | | | | | | |
| Fatty acids, saturated | g | 1.22 | 1.22 | 2.22 | 0.88 | 0.42 | 0.21 | 0.69 |
| Fatty acids, monounsaturated | g | 1.70 | 1.70 | 3.00 | 1.34 | 0.65 | 0.33 | 1.06 |
| Fatty acids, polyunsaturated | g | 4.14 | 4.14 | 3.83 | 3.43 | 1.65 | 0.83 | 2.70 |
| Omega-6 Fatty Acid | g | 3.57 | 3.57 | 3.59 | 3.02 | 1.45 | 0.74 | 2.38 |
| Omega-3 Fatty Acid | g | 0.55 | 0.55 | 0.22 | 0.41 | 0.20 | 0.10 | 0.32 |
| Vitamins | | | | | | | | |
| Thiamin | mg | 1.79 | 1.79 | 0.08 | 0.10 | 0.18 | 0.16 | 0.08 |
| Riboflavin | mg | 1.04 | 1.04 | 0.36 | 0.25 | 0.10 | 0.07 | 0.05 |
| Niacin | mg | 7.62 | 7.62 | 2.64 | 0.86 | 1.44 | 0.15 | 0.20 |
| Pantothenic acid | mg | 2.34 | 2.34 | 0.28 | 0.26 | 0.06 | 0.05 | 0.07 |
| Vitamin B-6 | mg | 0.99 | 0.99 | 0.22 | 0.22 | 0.10 | 0.04 | 0.05 |
| Folic | mcg | 532.50 | 532.50 | 23.90 | 33.00 | 176.10 | 1.50 | 15.00 |
| Vitamin A | IU | 30.00 | 30.00 | 0.00 | 87.00 | 0.00 | 32.00 | 85.00 |
| Vitamin E | mg_ATE | 0.15 | 0.15 | tr | 0.01 | 0.00 | 0.01 | tr |
| Biotin | mg | 0.02 | 0.02 | tr | tr | tr | tr | tr |
| Choline | mg | 60.00 | 60.00 | tr | tr | tr | tr | tr |
| Inositol | mg | 72.00 | 72.00 | tr | tr | tr | tr | tr |
| PABA | mg | 6.00 | 6.00 | tr | tr | tr | tr | tr |
| Special Nutrients | | | | | | | | |
| Isoflavones | mg | 4000.00 | 200.00 | 43.52 | 42.55 | 97.43 | 9.65 | 23.61 |
| Glycogen | g | 1.10 | 1.10 | tr | tr | tr | tr | tr |
| Beta Glucans | g | 0.50 | 0.50 | tr | tr | tr | tr | tr |
| Glutathione | mg | 60.00 | 60.00 | tr | tr | tr | tr | tr |
| SOD | unit | 1650.00 | 1650.00 | tr | tr | tr | tr | tr |
| RNA/DNA | g | 1.05 | 1.05 | | | | | |

An Empty Cell indicates a value is un-known;
"tr" indicates a value is probably a trace or none.

As can be seen from the above, the SOYNATTO product, provides proteins, minerals, and vitamins, in a fermented soy form. The fermentation process infuses the product with *saccharomyces cerevisiae*. *Saccharomyces cerevisiae* is commonly known as "bakers yeast" or "brewers yeast" and is more traditionally known to ferment sugars present in flour or dough, yielding carbon dioxide and alcohol. Accordingly, in the broad context of the present invention, the animal chew may contain one or more of a protein, one or more of a mineral, and one or more of a vitamin, along with *saccharomyces cerevisiae*.

Furthermore, it should be noted that the SOYANTTO product herein includes increased concentrations of glycitein, daidzein and genistein, which is reportedly several hundred percent more than other more common soyfood sources. These all belong to the isofavone class of flavanoids. They may also be classified as a phytoestrogen, since they are plant derived nonsterioidal compounds that contain estrogen-like biological activity.

Optionally, the animal chew herein may include enzymes and/or co-enzymes which are similarly available through Bio Foods, Ltd., Pine Brook, N.J and sold under the trademark BT-CoQ10, for example. This reportedly is a biologically transformed (fermented) cell mitochondrial coenzyme and contains Coenzyme Q10, antioxidants, phytonutrients and cofactor mineral nutrients and other cell constituents. Preferably, enzymes and/or co-enzymes are present between 0.1-10% (wt.), and resin (e.g., starch or thermoplastic as noted above) is present at levels of about 99-90% (wt.), including all incremental values therebetween with respect to such ranges. More preferably, when in combination with the fermented soya, the fermented soya may be present between 1-40% (wt.), the enzyme and/or coenzymes may be present between 0.1-10% (wt.) and the resin (e.g., starch or thermoplastic as noted above) may be present at levels of about 98-50% (wt.), including all incremental values therebetween with respect to such ranges.

Reportedly, the fermented coenzyme contains coenzyme Q10 which belongs to the family of compounds known as ubiquinones, which are either of two isomeric cyclic crystalline compounds $C_6H_4O_2$ that are di-keto derivatives of dihydro-benzene. Reportedly, Coenzyme Q10 is a fat-soluble compound primarily synthesized by the body and also consumed in the diet and is required for mitochondrial ATP synthesis. It also functions as an antioxidant in cell membranes and lipoproteins. Reportedly oral supplementation of coenzyme Q10 increases plasma, lipoprotein, and blood vessel levels. Also, reportedly Coenzyme Q10 supplementation has resulted in clinical and metabolic improvement in some patients with hereditary mitochondrial disorders.

Antioxidants are reportedly substances that prevent or reduce damage caused by reactive oxygen species or reactive nitrogen species. Phytonutrients or phytochemicals are reportedly chemicals that are produced by plants and are not necessarily essential nutrients but are considered beneficial to human health. Common classes of phytonutrients include carotenoids, flavoniods, phenols including polyphenols and terpenes. Cofactors are reportedly substances that need to be present in addition to an enzyme to catalyze some reactions.

Accordingly, the molded chew toy of the present invention contains one or more of those vitamins recommended for dogs by the American Association of Feed Control Officials (AAFCO). In the case of dogs, vitamins may comprise A, E, thiamin, riboflavin, niacin, panthothenic acid, folic acid and choline. In the case of cats, vitamins may comprise A, E, thiamin, riboflavin, niacin, panthothetic acid, folic actid, biotin and choline. In addition, the molded chew toy of the present invention also comprises minerals. In the case of dogs, the preferred minerals are calcium, phosphorus, potassium, sodium, magnesium, iron, copper, manganese, zinc, and selenium.

In one particularly preferred process of manufacturing the animal chew toy herein, starch and water are first combined wherein the water content is in the range of 20-40% by weight with respect to that of said starch. The mixture is introduced into a vented barrel extruder to form extruded beads, wherein the water content upon discharge is less than the water content of said mixture entering the extruder.

This is followed by introduction of the extruded beads to a heated injection molding machine containing a mold and injection molding and cooling to form the molded article wherein the water content of the molded article is at or below about 20% by weight, wherein the injection molding machine contains a hopper feed section, a barrel and an output nozzle, including a plurality of heating zones in said barrel extending from said hopper section to said nozzle including a plurality of heating zones extending from the hopper section to said output section wherein the heating zones are set at the following temperature ranges: zone 1 is at or below about 70° F.; zone 2 is at or below about 150° F., zone 3 is at or below about 300° F. and zone 4 is at or below about 375° F. and melt mixing and molding and cooling to form said chew toy wherein the water content of said chew toy is between 5% and 20% -with respect to the resin so that a portion of said fermented soya nutraceutical mixed therein or the enzymes and/or co-enzymes are not thermally degraded by said molding.

By way of another representative example, in the case of starch, e.g., the process herein may also rely upon combining starch with polyesteramide to form a mixture such that the mixture is suitable for melt processing techniques. In that regard, attention is directed at commonly owned U.S. Pat. No. 6,274,182, whose teachings are incorporated by reference which discloses a preferred process for forming starch into the molded article herein. The process makes use of melt processing techniques and comprises mixing polyesteramide with starch so that the starch becomes a continuous domain with discrete domains of the polyesteramide. The polyesteramide component is preferably dry mixed with the starch component, and that mixture is then molded into a desired shape. The polyesteramide may include aliphatic polyamides, aliphatic/aromatic polyamides, aromatic polyamides and mixtures thereof As those skilled in the art will appreciate, an injection molding apparatus, which is one preferred mixing apparatus, typically contains a hopper feed section, a barrel, and an output nozzle, including a plurality of heating zones in the barrel extending from the hopper section to the nozzle. In accordance with the present invention, it has been found preferable to maintain the temperature in the first zone adjacent to the hopper at a temperature of less than about 150° F. More preferably, the first zone adjacent to the hopper is set in the range of about 45-150° F. In an even more preferred embodiment, i.e. that situation wherein there is a first zone adjacent to the hopper, and a second zone adjacent to that first zone, the temperature of the first zone is set to between about 45-70° F., and the temperature of the second zone is set to between about 70-150° F. These temperatures are most conveniently achieved by use of cooling coils placed about the barrel of the injection molding apparatus. These cooling coils are preferably made from copper tubing, and are cooled with circulating water.

In a particularly preferred embodiment, the following temperature profile is used to mold the composition of the present invention: Zone 4 (closest to hopper)=45-70° F.; Zone 3=70-150° F; Zone 2=150-300° F; Zone 1=275-375° F; Nozzle=275-390° F. In addition, the bushing inside the mold is preferably set to about 325-425° F. The mold temperature is preferably set at 35-65° F.

As opposed to a more conventional practice of heating the barrel of the screw to melt the material in the zones proximate to the hopper, the temperature profile set forth above results in cooling the barrel in those zones thereby preventing overheating and burning of the polyesteramide/starch mixture. In addition, use of this temperature profile does not result in a thorough melt based intermixing of the polyesteramide component with the starch component. Rather, the molded polyesteramide/starch article contains discrete polyesteramide domains dispersed within a continuous starch phase. In the context of the present invention, such discrete polyesteramide domains may be visually distinct from the continuous starch phase, or readily viewable via optical microscopy.

As those skilled in the art will appreciate, the product may be molded into any of a variety of shapes, including a bone, rod, ring, disk, and the like. Accordingly, in broad aspects, although injection molding is preferred, any other type of molding process is contemplated. For example, the polyesteramide/starch composition of the present invention is suitable for compression molding as well as other thermoplastic processing techniques available in the art. In that regard, the herein starch/polyesteramide mixture can be prepared by extrusion techniques.

Another embodiment of the present invention relates to a chew comprising denatured and partially hydrolyzed collagen. Those skilled in the art will therefore recognize that collagen comprises the basic structural unit tropocollagen, which has a mass of about 285 kdal and consists of three polypeptide chains of about the same size. Such chain is comprised of the amino acids glycine, proline, hydroxyproline and hydroxylysine. The chain composition can depend upon the type of collagen, i.e., whether or not it is derived from, e.g., skin or cartilage. Any type of collagen source is suitable herein.

Denatured collagen is reference to the fact that the collagen when subjected to extremes of temperature or acid or alkaline conditions, denatures and separates into three polypeptide chains. The polypeptide is then partially hydrolyzed to a desired molecular weight, and dried or compounded for the application herein.

In accordance with the present invention, it has been found that it is preferable to mix the denatured and partially hydrolyzed collagen with another resin, such as casein, starch, vegetable matter, animal meal, peanut bits/flour, or a synthetic polymer resin, such as thermoplastic resin including polyamides and or polyurethanes, as well as ethylene copolymers, such as poly(ethylene acrylic acid) and/or poly (ethylene vinyl alcohol). In such regard, the mixtures have been found to lend it to melt processing under pressure, which include extrusion, injection molding and/or compression molding techniques. Accordingly, one can prepare injection molded type chew toys herein, comprising denatured and partially hydrolyzed collagen, as well as molded chew toys that combine such collagen with the various components noted above.

In another embodiment of the present invention, one may incorporate other types of components to the chew toy to increase the animal's attraction and/or improve the cosmetic appearance of the molded product. For example, one may optionally incorporate flavorings at a level of 0.1-5% by weight. Preferably, flavoring may comprise both powders, liquids and mixtures thereof. Food coloring may also be incorporated at a level of 0.01 to 10% by weight. More preferably, natural flavorings and food coloring is incorporated into the mixtures. In addition, one may optionally incorporate calcium carbonate which has been found to increase the hardness of the products produced therefrom. In addition, one may optionally incorporate a humectant such as oat fiber, in the range of 0.1-5%.

The foregoing description is provided to illustrate and explain the present invention. However, the description hereinabove should not be considered to limit the scope of the invention set forth in the claims appended here to.

What is claimed is:

1. An enriched animal chew toy comprising a starch resin and a fermented soya nutraceutical, wherein the fermented soya nutraceutical comprises about 40% by weight carbohydrate and about 37% by weight protein, and wherein said starch resin is present at levels between about 50-99% by weight and said fermented soya nutraceutical is present at levels between about 1-40% by weight.

2. The enriched animal chew toy of claim 1 wherein said fermented soya nutraceutical provides proteins, minerals or vitamins in a fermented soy form.

3. The enriched animal chew toy of claim 1 wherein said fermented soya nutraceutical contains *saccharomyces cerevisiae*.

4. The enriched animal chew toy of claim 1 further comprising a fermented enzymes and/or coenzymes wherein said fermented enzymes and/or coenzymes are present at levels between about 0.1-10% by weight, said starch resin is present at levels between about 50-98% by weight and said fermented soya nutraceutical is present at levels between about 1-40% by weight.

5. The enriched animal chew toy of claim 1 wherein said starch resin is selected from the group consisting of potato starch, tapioca starch, corn starch, wheat starch and mixtures thereof.

6. The enriched animal chew toy of claim 1, further comprising a food coloring, wherein said food coloring is present between about 0.1 weight percent to about 5 percent weight based upon the weight of said starch resin.

7. The enriched animal chew toy of claim 1, further comprising a flavoring selected from the group consisting of a liquid flavoring, a powdered flavoring, and a mixture thereof, wherein said flavoring is present between about 0.1 weight percent to about 5.0 percent weight based upon the weight of said starch resin.

8. A method of forming an enriched animal chew toy comprising:
   (a) combining a starch resin and a fermented soya nutraceutical, wherein said fermented soya nutraceutical comprises about 40% by weight carbohydrate and about 37% by weight protein to form a mixture, and wherein said starch is present at levels between about 50-99% by weight of said mixture and said fermented soya nutraceutical is present at levels between about 1-40% by weight of said mixture;
   (b) introducing and heating said mixture to a heated molding machine containing a feed section, a baffel section and an output section, including a plurality of heating zones extending from said hopper section to said output section;
   (c) mixing; and
   (d) forming said mixture into an animal chew.

9. The method of forming an enriched animal chew toy of claim 8 wherein said heating zones are set at the following temperature ranges: zone 1 is at or below about 70° F.; zone 2 is at or below about 150° F., zone 3 is at or below about 300° F. and zone 4 is at or below about 375° F.

10. The method of forming an enriched animal chew toy of claim 8 wherein said nutraceutical further comprises enzymes and/or coenzymes, wherein said fermented enzymes and/or coenzymes are present at levels between about 0.1-10% by weight, said starch resin is present at levels between about 50-98% by weight and said fermented soya nutraceutical is present at levels between about 1-40% by weight.

11. The method of forming an enriched animal chew toy of claim 8 wherein said heated molding machine comprises an injection molding machine or an extruder.

12. The method of forming an enriched animal chew toy of claim 8 wherein said starch resin further comprises water, wherein the water content of said chew toy is between 5% and 20% by weight with respect to the starch resin.

13. The method of forming an enriched animal chew toy of claim 8 wherein said starch resin is selected from the group consisting of potato starch, tapioca starch, corn starch, wheat starch and mixtures thereof.

14. The method of forming an enriched animal chew toy of claim 8 wherein said starch resin further comprises water, wherein said water content of said mixture in step (b) as introduced to said molding machine is at or below 20% by weight.

15. The method of forming an enriched animal chew toy of claim 8 further comprising combining a food coloring to form said mixture, wherein said food coloring is present between about 0.1 weight percent to about 5 weight percent based upon the weight of said starch resin.

16. The method of forming an enriched animal chew toy of claim 8 further comprising combining a flavoring to form said mixture, said flavoring selected from the group consisting of a liquid flavoring, a powdered flavoring, and a mixture thereof, wherein said flavoring is present between about 0.1 weight percent to about 5.0 weight percent based upon the weight of said starch resin.

17. The method of forming an enriched animal chew toy of claim 8 wherein said chew toy comprises the shape of a bone, a disk, a rod, or a ring.

\* \* \* \* \*